No. 746,909. Patented December 15, 1903.

UNITED STATES PATENT OFFICE.

ADOLF ZAND, OF CHARLOTTENBURG, GERMANY.

PROCESS OF PRODUCING IRIDESCENT SCALES.

SPECIFICATION forming part of Letters Patent No. 746,909, dated December 15, 1903.

Application filed May 6, 1903. Serial No. 155,939. (No specimens.)

*To all whom it may concern:*

Be it known that I, ADOLF ZAND, a subject of the Emperor of Russia, and a resident of Charlottenburg, Germany, have invented a Process of Producing Iridescent Scales, of which the following is a description.

The present invention consists of a process for producing small flakes or scales of an iridescent nature from mother-of-pearl waste, the said flakes or scales being subsequently coated onto ornamental and other articles to which they impart an iridescent luster, producing very pretty effects.

According to the present invention the mother-of-pearl waste is first boiled in a diluted solution of hydrochloric acid containing about one per cent. of the acid for a period of from twenty to thirty minutes, and then it is heated or glowed in a glow-oven at a temperature of about 300° to 400° centigrade for the space of about five minutes, care being taken that the degree of heat is not sufficiently high to destroy the organic substances contained in the mother-of-pearl waste. When this has been done, the waste is subjected to the action of suitable crushing-rollers, which crush it to small flakes or scales. The waste, which is easily crushed, after the glowing process retains the iridescent luster entirely unimpaired and there is no need of polishing the flakes or scales afterward. This fact is of considerable importance, since many articles are of a shape which would render the polishing operation impossible.

The iridescent flakes or scales may be employed for a great variety of purposes—for ornamenting house facades, for wall-papers, for picture-frames, and many other objects.

I claim as my invention—

A process for producing iridescent flakes or scales from mother-of-pearl waste which consists in first boiling the mother-of-pearl waste, in a diluted solution of hydrochloric acid, then heating or glowing the same at a temperature which is not sufficiently high to destroy the organic substances in the mother-of-pearl waste, and then crushing to flakes or scales, in the manner and for the purpose substantially as described.

In witness whereof I have hereunto set my hand in presence of two witnesses.

ADOLF ZAND.

Witnesses:
HENRY HASPER,
WOLDEMAR HAUPT.